Aug. 20, 1963 R. PILOTY 3,101,468

ARRANGEMENT FOR THE STORING OF BINARY INFORMATIONS, ARRIVING IN SERIES OR SERIES-PARALLEL, IN A STORAGE CHAIN OR A STORAGE MATRIX

Filed Sept. 2, 1958 3 Sheets-Sheet 1

INVENTOR
R. PILOTY

BY Robert Harding Jr.
ATTORNEY

ARRANGEMENT FOR THE STORING OF BINARY INFORMATIONS, ARRIVING IN SERIES OR SERIES-PARALLEL, IN A STORAGE CHAIN OR A STORAGE MATRIX

Filed Sept. 2, 1958 3 Sheets-Sheet 2

INVENTOR
R. PILOTY

BY Robert Harding Jr.
ATTORNEY

Aug. 20, 1963 R. PILOTY 3,101,468

ARRANGEMENT FOR THE STORING OF BINARY INFORMATIONS, ARRIVING IN SERIES OR SERIES-PARALLEL, IN A STORAGE CHAIN OR A STORAGE MATRIX

Filed Sept. 2, 1958 3 Sheets-Sheet 3

INVENTOR.
ROBERT PILOTY
BY Percy P. Lantzy
ATTORNEY

United States Patent Office 3,101,468

Patented Aug. 20, 1963

3,101,468

ARRANGEMENT FOR THE STORING OF BINARY INFORMATIONS, ARRIVING IN SERIES OR SERIES-PARALLEL, IN A STORAGE CHAIN OR A STORAGE MATRIX

Robert Piloty, Stuttgart-Kaltental, Germany, assignor to International Standard Electric Corporation, New York, N.Y., a corporation of Delaware Filed Sept. 2, 1958, Ser. No. 758,390
Claims priority, application Germany Sept. 21, 1957
4 Claims. (Cl. 340—174)

Figure 1:
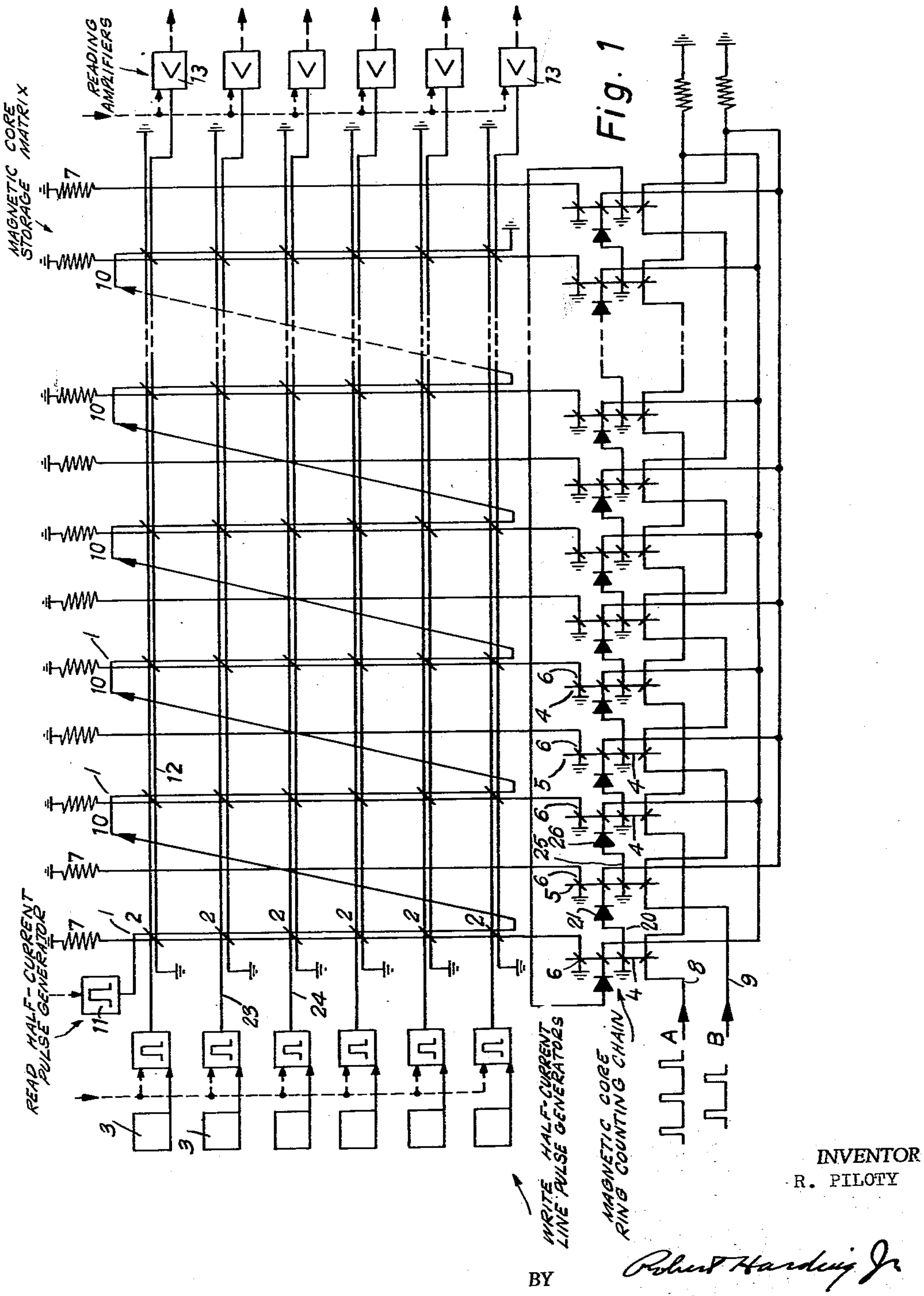

It is often necessary in data processing systems to transmit information between groups of equipment having different transmitting and receiving rhythms, and which are thus difficult to synchronize. For this reason it is required in most cases to provide an asynchronous buffer storage, that is, a storage device capable of receiving the information in the rhythm of the transmitter, and, thereupon, of transmitting the information in the rhythm of the receiver. This problem arises, for example, when transmitting information, which is stored on a magnetic tape, to other recording devices or to magnetic drums, or whenever information is required to be read from the magnetic tape into the central arithmetic unit of a computing system.

It is one characteristic feature of certain data processing operations that a relatively great number of characters are transmitted in the course of one operation, e.g. all informations forming part of an invoice, such as address, customer number, invoice items, totals, etc. The buffer storage, therefore, must be capable of accepting a very great number of information bits. In addition thereto the information to be stored is mostly applied thereto in a series-parallel manner, i.e., character by character or, in series, i.e., bit by bit.

For this reason it is deemed appropriate to provide buffer registers of a high capacity in the shape of shift registers. However, shift registers constructed of flip-flop circuits are very expensive, as a rule, which was one of the reasons for starting to construct such types of shift registers from ferrite cores. Since such types of buffer storage are mostly very large, relatively large currents are also required which means that with the conventional types of ferrite storage devices special current amplifier arrangements have to be provided.

The present invention relates to an arrangement for storing binary informations, which arrive in series or in a series-parallel manner, either in a chain of storage devices or in a storage matrix, the storage cells of which consist of magnetic cores, by employing the coincidence current principle, in which a storage is effected in that particular cell of the arrangement whose line and column wire simultaneously conduct a current $+Ic/2$.

The basic object of the invention is to avoid shifting the shifting through the storage matrix, because to this end, and in the case of a complex-type of matrix, very large currents are required. By means of the arrangement according to the invention, this disadvantage is now avoided in that the matrix shifting process is reduced to a more simply manifested process of distributive storage which is controlled by a ring counter requiring relatively low current advancing pulses.

The general idea of invention consists in assigning two magnetic switches to each column, and connecting all first switches in series with one control lead and all second switches in series with another control lead, via which control leads the stepping pulses are transmitted alternately, and which are connected in such a way with the column wires that in the odd rhythms a positive, and in the even rhythms a negative half-current is produced in the columns, and in that all switches are wired to form a counting chain which is stepped on by one step at each stepping pulse, thus effecting the production of a half-current only in that particular column in the associated switch pair of which one switch is in the counting position.

One feature of the invention provides that a pair of driving cores is assigned to each column of the chain of storage devices or of the storage matrix, the first core of which is connected via an output winding with the associated column wire, delivering a positive half-current at the odd rhythm, and a negative half-current at the even rhythm to the column, while the second core serves as an intermediate storage device for the counting steps. By means of this intermediate storage device, the possibility of storing the half-current in a single column only is ensured.

Another feature of the invention consists in employing a so-called current control counter, which is a modification of the above mentioned counter. It is constructed in such a way that a pair of cores is assigned to each column and that the cores are wired in such a way with respect to each other to form a current-controlled counting chain that the first core will deliver a positive and the second core a negative half-current to the associated column.

Figure 2:
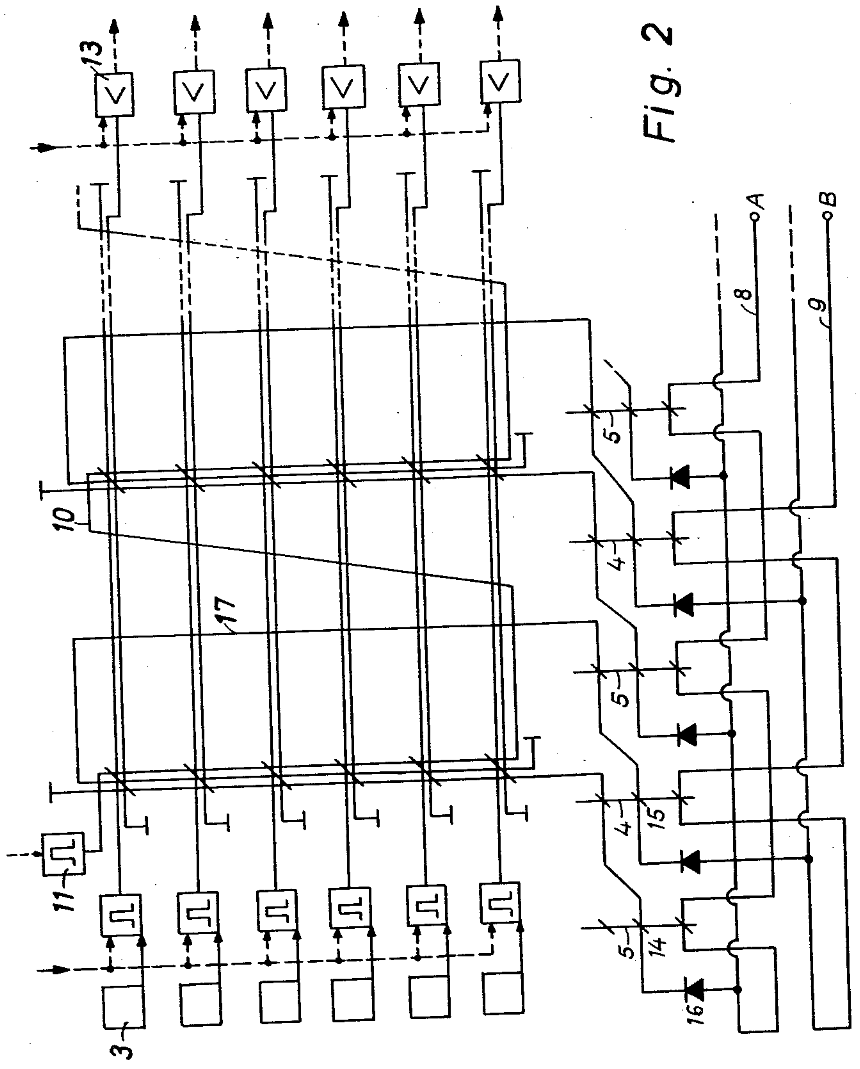
Figure 3:
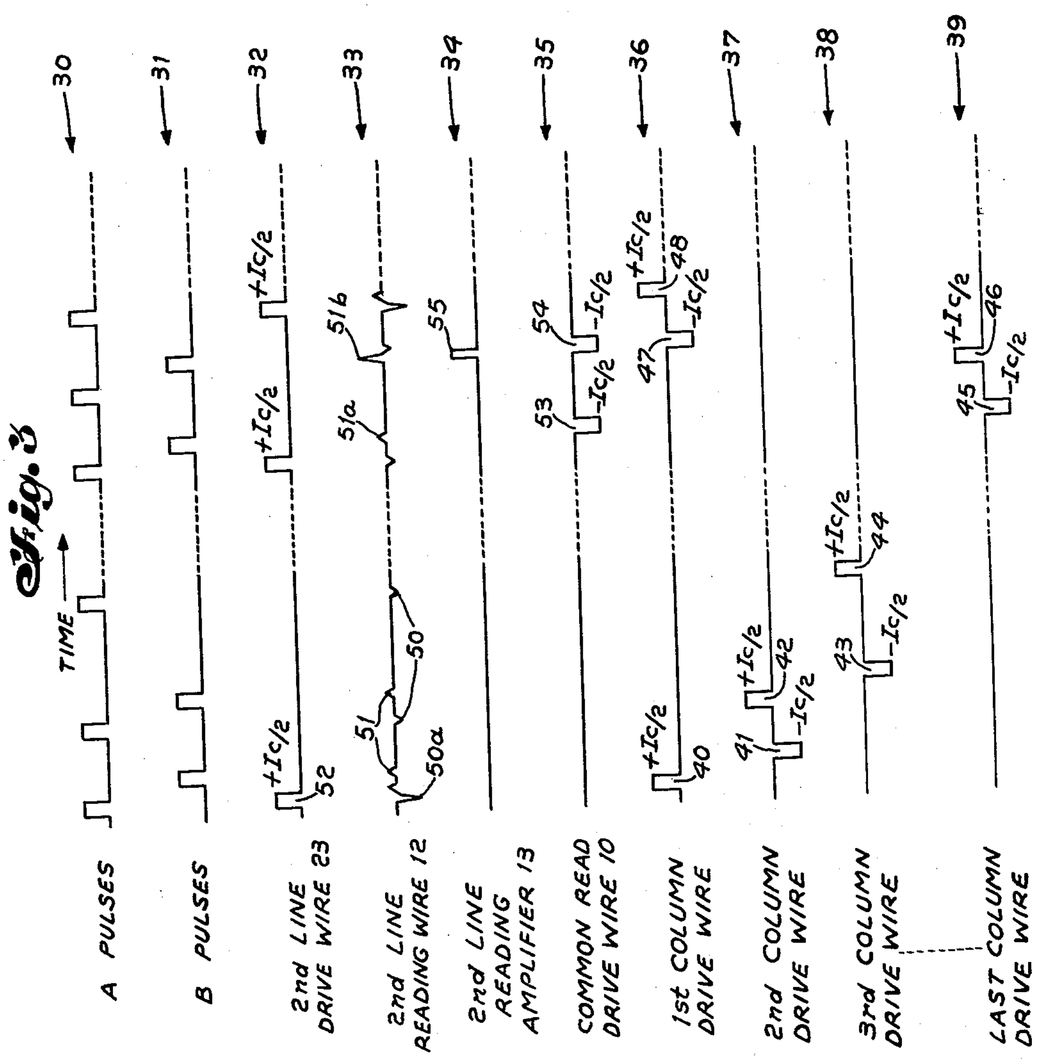

In the following the invention will now be described in particular with reference to FIGS. 1 and 2 of the copending drawings, in which:

FIG. 1 shows a storage matrix comprising a counter according to the first proposal FIG. 2 shows a storage matrix comprising a counter according to the second proposal FIG. 3 is a timing diagram useful in explaining the operation of the matrix system shown in FIG. 1.

The buffer register consists of a storage core matrix and is intended for a series-parallel operation. Each column 1 of the magnetic-core matrix contains as many magnetic cores 2 as the number of elements of the respective character. The number of columns depends on the number of characters which are to be received as a maximum by the buffer register. The matrix is operated in accordance with the coincidence current principle. In other words, a coincidence between a $+Ic/2$ line current and a $+Ic/2$ column current in one core causes this core to assume the condition "1," while a coincidence between corresponding negative line and column currents, $Ic/2$ will cause it to assume the condition "0." Each line current is produced in the conventional manner by a transistorized current generator 3, while the column currents are produced by a larger driving core 4 associated with each column. The driving cores 4 and 5, in turn, are interconnected to form a flip-flop shift register or a ring core counter. Each core of the counting chain is provided with one column output winding 6, but only the cores 4 are connected with an associated, column wire of the matrix. The resistor 7, in series with the output circuit of each particular core of the counting chain, effects an almost constant load thereon. The number of turns of the output windings, as well as the strength of the stepping pulses of the counting chain, are so dimensioned that exactly the current $Ic/2$ will flow through the load resistor 7.

If now, e.g. the first core 4 of the counting chain has assumed the condition "1," while all other cores are in the condition "0," and the counting chain is stepped on by an A-pulse over the line 8, then the first core 4 will be restored to "0" and the second core 5 will be caused to assume the condition "1" in a manner to be described. Consequently, the first core 4 will induce a current $+Ic/2$ in the first column of the matrix, and will cause the first core 5 to shift to "1" and a $-Ic/2$ current to be induced in the first blind column, i.e. the column without a matrix core, via connection 20 and rectifier diode 21. If, at the same time-position, all of the line wires are deenergized, then no matrix core will change its condition. If, on the other hand, the second line 23 and the third line 24 conduct an $+Ic/2$ current, then the corresponding matrix cores of the first column will be caused to assume the condition "1." The cores of the remaining columns, however, will remain entirely quiescent. In this way the first column is acted upon.

At the next stepping pulse, i.e. at the first B-pulse the first core 5 of the counting chain is shifted via line 9 to position "0," which thus induces in the associated blind column a current $+Ic/2$. At the same time the second core 4 of the counting chain is caused to assume the condition "1," via connection 25 and rectifier diode 26 and induces into its associated column a current $-Ic/2$. During this B-pulse the line leads or line wires will always remain deenergized, so that the condition of the matrix will remain unchanged. Accordingly, a blind counting step is involved. When the following second A-pulse occurs a $+Ic/2$ current will be induced in the matrix column containing the second core 4, so that this column, in cooperation with the $+Ic/2$ line current, may now shift a particular core in the column. In this way, and upon appearance of each new A-pulse, a character can be stored in a new matrix column, until the matrix is filled up.

The fact that, when the counting chain steps, that particular core which is transferred by the preceding one to the condition "1," produces a current $-Ic/2$ may now be used for the subsequent reading of the information stored in accordance with the above mentioned method. To this end a wire 10 is provided, extending through all cores of the matrix in the manner as shown in the drawing. If, for example, a $-Ic/2$ current is just being produced by the third core of the counting chain, which is the case at the first B-stepping pulse, and if, by the simultaneously keyed current generator 11, a pulse of the magnitude $-Ic/2$ is applied to the common wire 10 then all cores of the second matrix column are caused to assume the condition "0." All other cores of the matrix either receive the current zero or $-Ic/2$. Those particular cores of the second column which previously had stored a "1" will induce a voltage in the linewise disposed reading wires 12 passing through which is utilized in the conventional manner by the reading amplifiers 13. In this way one column after the other can be read. If the reading process passes through the entire matrix, then the latter will finally be completely in the erased condition. If the read information is not to be lost, then this information, as read during the B-pulse rhythm, must be immediately applied to the recording generators 3 in a manner not shown and, at the same time, the recording generators will have to be activated by the subsequently following A-pulse also in a manner not shown. In this case the character will be stored again in the column of the matrix, just described. By the next successive B-pulse the next column can be read and by the subsequently following A-pulse this column can be filled or written-in again. In this way any suitable or desired parts of the matrix may be read without the contents of the read columns being lost.

However, if it is desired to set the counting chain to any random position without changing the condition of the matrix, then it is only necessary to step the counter on without causing an excitation of the line wires or of the common matrix line. Then the danger of disturbing the unambiguous condition of the matrix cores at a repeated setting of the counter will not exist, because in a column the $-Ic/2$ currents will of necessity always be followed by $+Ic/2$ currents.

Referring to FIG. 3, the arrows designated 30 to 39 identify time charts which characterize the operation of the magnetic storage system discussed above. Charts 30 and 31 illustrate the timing of the A- and B-pulses used to step the ring counting chain and particularly emphasize the fact that these pulses need not occur periodically so long as they occur in sequence (i.e. A, B, A, B, . . .).

Chart 32 illustrates the electrical condition of the drive (e.g. write select) wire 23 which passes through the second line (i.e. row) of storage cores, the half-select write current pulses applied thereto having the amplitude $+Ic/2$.

Charts 33 and 34 respectively illustrate the electrical conditions of the reading (e.g. sense) wire 12 passing through the second line of storage cores, and the output of the second line read amplifier 13 to the input of which the reading wire is connected. It should be particularly noted that the output of this amplifier 13 can only be excited during B-pulse intervals, and then only if a pulse of a given polarity (in the illustration, positive), and of sufficient amplitude, is present on the corresponding read wire 12.

Chart 35 illustrates the electrical condition of the common read drive wire 10 used to apply half-select read pulses to all of the storage cores during B-pulse intervals in which cores are required to be read out.

Charts 36 to 39 illustrate the electrical conditions, on the column drive wires which are coupled to the first, second, third, and last columns of matrix storage cores, respectively, reading from left to right in FIG. 1. These charts thereby serve to effectively illustrate the sequence of conditions occurring on all of the column drive wires.

As may be seen from the progression of pulses 40 to 46 in charts 36 to 39, the column drive wires are excited in a predetermined sequence, in accordance with the stepping of the ring counting chain by the A- and B-pulses shown in charts 30 and 31. It should be noted that, as previously indicated, each excited matrix column drive wire is first energized with a half-select write current pulse of a given polarity (in the drawing, negative) and given amplitude ($Ic/2$), in coincidence with an A-pulse, and this is followed by the application of an opposite (e.g. $+Ic/2$) half-select read current, pulse, coincident with the next B-pulse, to the same column wire. The fact that the A- and B-pulses need not occur periodically is emphasized by the non-uniform spacing of the A- and B-pulses coinciding with the pulses 40 to 44.

The first column pulses 47 and 48, in chart 36, follow the last column pulses 45 and 46, in chart 39, thereby illustrating the cycling of the ring counting chain.

As the write and read half-select pulses appear on the column drive wires corresponding respective signal excursions 50 and 51 are induced in each reading wire 12 (of negative and positive polarity, respectively, in the illustration of chart 33), in accordance with the intelligence being written in or read from the selected storage cores to which the reading wires are coupled. For example, if a "one" is to be written into the storage core located in the first column, second line, position of the matrix, as is the case where the first column and second line wires are simultaneously marked with positive $Ic/2$ half-select pulses, as indicated, for example, at 52 and 40 in charts 32 and 36, respectively, then a negative fluctuation 50a, of relatively large amplitude, is induced in the second line reading wire. On the other hand, if a "zero" is being written, as is for example indicated—for the second line, second column, core position—by pulse 42 in chart 37, the second line drive wire 23 remains quiescent, and a relatively small negative fluctuation is induced in the second line wire 12. Regardless of whether a "one" or "zero" is being written, the output of the second line amplifier (chart 34) remains at its quiescent level.

Next, if a column of storage cores is to be interrogated, as indicated—for the last and first columns—by the negative $Ic/2$ current pulses 45 and 47, respectively, in time coincidence with the respective $-Ic/2$ pulses, 53 and 54, on common wire 10 (chart 35), then a positive output fluctuation is produced on each line reading wire 12, the amplitude of which is representative of the intelligence stored in the interrogated core. The small amplitude pulse 51a is thus indicative of the storage of a "zero" in the core which occupies the last column position in the second line, while the storage of a "one" in the core in the first column position of that line is indicated by the larger positive pulse 51b. The reading amplifier 13 being responsive solely to read-out signals exceeding a given amplitude, it responds only to the pulse 51b and issues a pulse 55 at its output, pulse 55 thus indicating the sensing of the "one" previously written by the pulses 40 and 52.

Thus, it may be concluded that an output signal appears at the output of reading amplifier 13 only during read, or B-pulse intervals, and then only providing that a pulse is applied to the common wire 10 and a corresponding core is in the "1" state. Similarly it is noted by way of summary that a "1" is stored in any given core only if pulses appear coincidentally, during an A interval, on the corresponding line and column wires.

It should be clear from the above that the reading and writing operations are entirely independent of each other. During one cycle of stepping of the ring counter shown in FIG. 1, information may be written into the matrix cores, at one rate of A and B excitation, and in a second cycling of the counter the same information may be read out of the matrix, at the same, or a different stepping pulse rate. It will further be clear, to those skilled in the art to which this invention pertains, that the information read out of the matrix may easily be written back into the matrix during the A-pulse interval following a B read-out pulse interval in a completely straightforward manner.

In FIG. 2 of the accompanying drawings another example of materializing the general idea of the invention is shown. The storage matrix is constructed in the same way as the one shown in FIG. 1, but in this case the construction of the counter is merely modified to form a counter of the current-controlled type. A pair of cores 4, 5 is again assigned to each column. Also in this case the input windings of all cores 4 are connected in series with one another to control lead 9 and the input windings of all cores 5 are connected in series with one another to control lead 8. The mode of operation of this counter will be easily understood from the showing of FIG. 2; at the occurrence of an A- or B-pulse, only that particular core will be acted upon which has already assumed the condition "1." This core, therefore, will be changed to the condition "0." If we assume that the first core 5 is in the "1" condition and that an A-pulse is delivered over the lead 8, then the voltage which is induced on account of this in the winding 14 will block, via the conductive diode 16, all other diodes 16 connected to this lead, and will thus transfer the stepping pulse, via the first-mentioned diode 16, winding 14 of the first core 5 and the winding 15 of the next column, to the next column of the matrix. The stepping current which is consequently flowing through the winding 15 of the next core will cause this one to shift to condition "1." Accordingly, the winding 15 simultaneously serves as an output winding for the column half-current $Ic/2$. At the next successive stepping rhythm, i.e., the first B-pulse, the counting chain will be stepped on in the course of which a negative half-current will be produced by the next successive core. This may either be caused by correspondingly winding the turns of winding 15 of the cores 4, or by reversing the column wire 17 as shown in FIG. 2.

The difference compared with the first mentioned arrangement consists in that the first core delivers the positive, and the second core the negative half-current. For the rest of it all processes are the same as described with reference to FIG. 1. The described arrangement bears the advantage of operating with relatively low pulse outputs because only two big cores need to be shifted or switched over in the counting chain. In contrast thereto and in normal types of magnetic-core shift registers, the pulse outputs required for the stepping purpose have to be variable within wide limits quite depending on the stored information. In the most unfavourable case, i.e., in which only units (1) are stored in the register, the required power would be unbearably high.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A magnetic storage matrix comprising a plurality of magnetic storage cores arranged in rows and columns, a ring counting chain having successive stages thereof coupled to corresponding columns of said storage cores each said stage being operative to inductively couple first and second half-signal currents of an opposite polarity to said corresponding column of storage cores when a count condition is stepped respectively into and out of said stage, a separate line wire threading each said row of cores, means coupled to said line wires for selectively supplying half-signal write-in currents thereto in synchronism with and in the same magnetic sense as said second half-signal column currents supplied by said counting chain stages for writing information in parallel into cores in selected columns of said matrix, a common read wire threading all of said storage cores in the same magnetic sense, and means for selectively supplying half-signal read currents to said common wire in synchronism with and in the same magnetic sense as said first half-signal column currents supplied by said counting chain stages for reading information in parallel out of selected columns of said matrix.

2. A storage matrix according to claim 1 wherein said counting chain comprises first and second magnetic switch cores in each said stage thereof, one of said switch cores of said chain being initially set to a first state of magnetic remanence while the other cores of said chain are all in an opposite second state of magnetic remanence, a first control lead coupled to all of said first switch cores for simultaneously driving all of said first cores towards said second state, a second control lead coupled to all of said second switch cores for simultaneously driving all of said second cores towards said second state, a first unidirectional signal transfer network coupled between the first and second switch cores of each said stage for driving said second core to said first state when said first core is switched from said first to said second state by a signal on said first control lead, and a second unidirectional signal transfer network coupled between the second switch core of each said stage and the first switch core of the next succeeding stage of said chain for driving said succeeding first core to said first state when said second core is switched from said first to said second state.

3. A storage matrix according to claim 2 wherein said counting chain further comprises an output winding on each said first switch core and said matrix includes a column wire threading each column of storage cores and connected to the output winding of the corresponding first switch core, said output winding supplying positive and negative half-signal currents to said column wire as said first switch core is respectively switched into said first and second states.

4. A storage matrix according to claim 2 wherein first and second column wires thread each said column of storage cores in magnetic opposition to each other, and further wherein each said first transfer network recited in claim 2 is connected to the second column wire threading the column of storage cores, corresponding to the stage of said chain, and each said second transfer network is connected to the first column wire threading the said column of storage cores.

References Cited in the file of this patent

UNITED STATES PATENTS

| | | |
|---|---|---|
| 2,708,267 | Weidenhammer | May 10, 1955 |
| 2,884,621 | Ross | Apr. 28, 1959 |
| 2,895,124 | Harris | July 14, 1959 |
| 2,896,193 | Herrmann | July 21, 1959 |
| 2,905,932 | Ruhman | Sept. 22, 1959 |
| 2,911,626 | Jones et al. | Nov. 3, 1959 |
| 2,921,297 | Lund | Jan. 12, 1960 |
| 2,922,145 | Bobeck | Jan. 19, 1960 |
| 2,931,014 | Buchholz et al. | Mar. 29, 1960 |
| 2,931,022 | Triest | Mar. 29, 1960 |
| 2,952,007 | Meyerhoff et al. | Sept. 6, 1960 |
| 2,959,770 | Eckert | Nov. 8, 1960 |
| 2,978,682 | Green | Apr. 4, 1961 |
| 2,987,707 | Fuller et al. | June 6, 1961 |
| 2,994,070 | Goatcher | July 25, 1961 |